Aug. 5, 1969     J. N. SIMPSON ET AL     3,458,865
LENS RETAINING DEVICE
Filed July 20, 1967     2 Sheets-Sheet 1
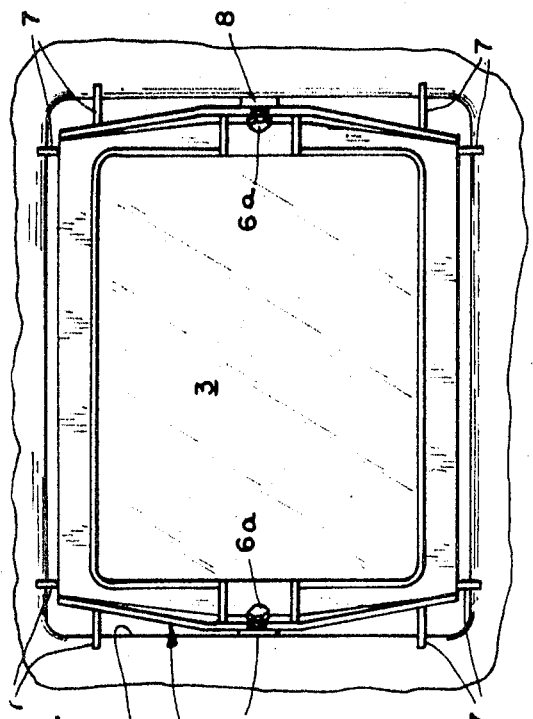
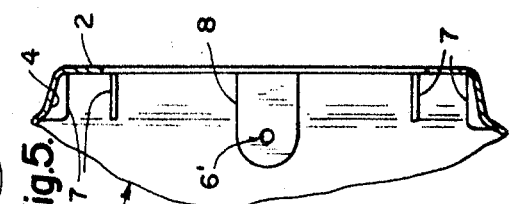
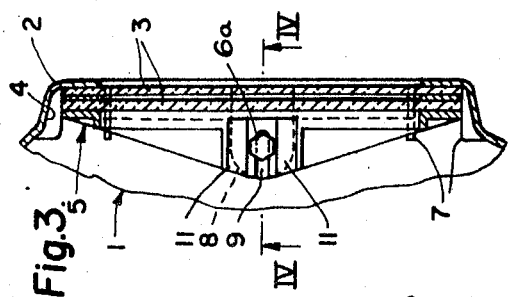
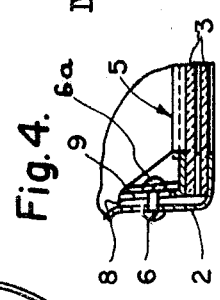
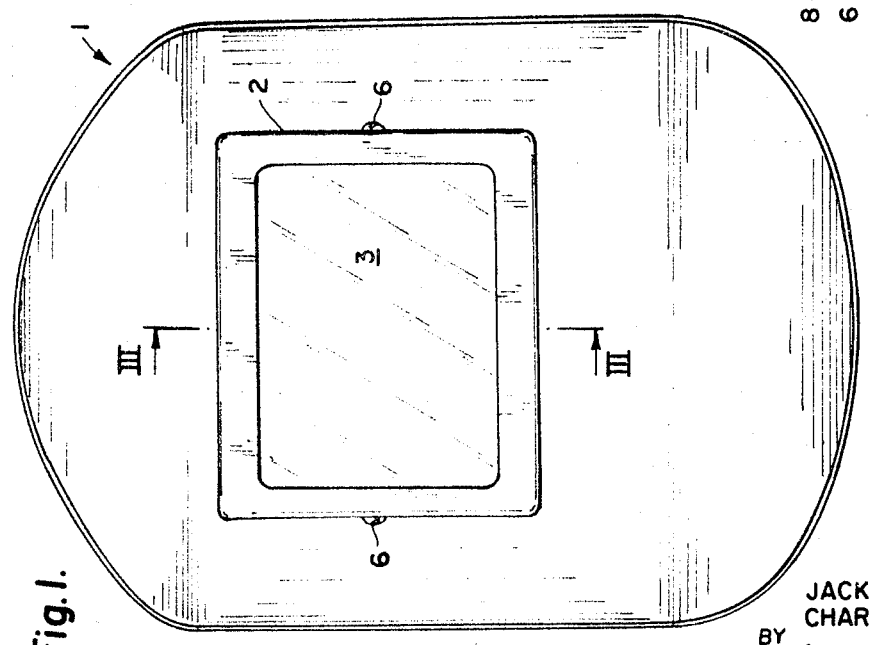
INVENTORS.
JACK N. SIMPSON
CHARLES J. BOYER
BY *William J. Ruano*
their ATTORNEY

United States Patent Office 3,458,865
Patented Aug. 5, 1969

3,458,865
LENS RETAINING DEVICE
Jack N. Simpson, Sinking Spring, and Charles J. Boyer, Reading, Pa., assignors to ESB Incorporated, Philadelphia, Pa.,
Filed July 20, 1967, Ser. No. 654,802
Int. Cl. A42b 3/00
U.S. Cl. 2—8                    2 Claims

ABSTRACT OF THE DISCLOSURE

A lens retainer for a safety or welding helmet which holds any combination of lenses or filters by means of a retainer bracket which nests and is easily and quickly secured to the inside of the helmet by two screws and two nuts.

---

This invention relates to a safety or welding helmet construction and, more particularly to a lens retainer or holder therefor.

A common disadvantage of conventional lens holders is that they are separate units that are mounted by gaskets in a fixed position relative to the viewing window of a safety or welding helmet. The mounting is generally such that it becomes necessary to always use the same thickness of lenses and gasket panels in order to have the lenses held securely against the helmet in the alloted space. Often this means that even if only a single lens or filter element is desired, it is necessary to use other lenses and gasket panels to provide the required thickness for holding the lenses securely.

Another disadvantage of this arrangement is that it is bulky. The requirement for sealing gaskets to contact metal and glass parts makes the assembly thicker than required and introduces problems in maintaining a seal. This condition also results in having the eyes of the wearer at an incorrect distance from the lens or filter, thereby causing some distortion of vision or narrowing of the field of vision.

Still another disadvantage of presently known safety or welding type helmet lens retainers is that they are somewhat difficult and time consuming to mount and replace in the helmet, or to make changes in the cover lens and filter lens assemblies.

An object of the present invention is to provide a lens retaining system or device that will obviate the above-named disadvantages.

A more specific object of the invention is to provide a lens retaining system or device which is adjustable to hold securely any combination of lenses or filter desired without requiring unnecessary lenses or gaskets as fillers.

Another object of the invention is to provide a novel lens retaining system or device which enables quick and easy assembly or replacement of the lens or filter elements.

Still another object is to provide a lens retainer in which the fastening nuts are non-rotatable so as to be self-tightening with the screws and very secure.

Another important object of this invention is to provide a compact lens system whereby the eyes of the wearer can be in close proximity to the desired lens or filter for a better view or for the widest possible field of vision.

Other objects and advantages will become more apparent from a study of the following description taken with the accompanying drawings wherein:

FIG. 1 is a front elevational view of a safety or welding type helmet having a lens retaining device embodying the present invention;

FIG. 2 is an enlarged, fragmentary rear elevational view thereof to more clearly show the lens retaining device;

FIG. 3 is a cross-sectional view taken along line III—III of FIG. 1;

FIG. 4 is a fragmentary, cross-sectional view of the fastening means as taken along line IV—IV of FIG. 3;

FIG. 5 is a cross-sectional view similar to FIG. 3 except that the lenses and fastening means are omitted from this view to show the supporting helmet construction;

Figure 6:
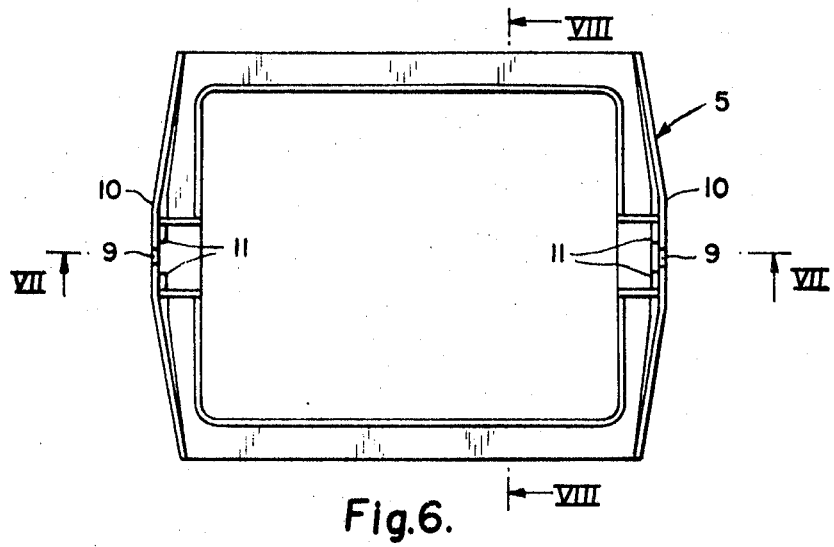
FIG. 6 is an elevational view of the retainer bracket.
Figure 7:
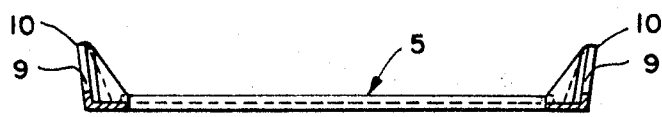
FIG. 7 is a cross-sectional view taken along line VIII—VIII of FIG. 6.

Referring more particularly to FIG. 1 of the drawings, a safety or welding type helmet, generally denoted by numeral 1, of fiber, fiberglass, plastic or other suitable material, has a frame or rectangular well portion 2 which is integrally formed on the front of the helmet at 4 for receiving and positioning a single or a combination of lenses or filters, generally denoted by numeral 3. A large opening or viewing window is provided in frame or well portion 2.

The lenses are common protective lenses of glass, plastic or similar transparent, reflective, absorbent or semi-opaque material. If more than one lens is used, it may be desirable to separate the lenses with gaskets to prevent scratching. In the case where plastic lenses are used, no gaskets would be required since all the other retaining elements may be made of plastic and hence would act as gasket material.

A pair of fastening means, bolts 6 and nuts 6a are mounted on the sides of frame 2 and their function will be subsequently described.

The rear or inside portion of frame 2 has a series of integral ribs or stop elements 7 located around the inner periphery of the viewing window. A pair of flanges 8 located on opposite sides of the inner wall of frame 2 have a pair of holes 6' to receive bolts or fastener elements 6.

Figure 8:
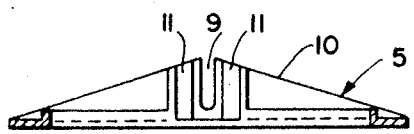
FIG. 8 is a side elevational view of the retainer bracket.

A retainer bracket, gnerally denoted by numeral 5 (best seen in FIGS. 6 and 8), is comprised of a thin frame having triangular end flanges 10, which have recess-forming flanges 11 and open ended slots 9 (see FIG. 8). The bracket is preferably made of plastic material, such as polyethylene with a matte-finish or other light and rigid material, preferably non-metallic.

The device is assembled by positioning lenses 3 against stop elements to assure proper alignment. Retainer bracket 5 is then placed against the back of the rearmost lens or filter (see FIG. 2) and the fastening element, such as bolt 6, is inserted from the exterior of the front portion of the helmet, through a hole in flange 8 and into slot 9 where it is secured with a nut, such as a cap nut 6a or the like, which is internally threaded to receive and hold bolt 6. Cap nut 6a has a head portion with opposite sides spaced slightly less than the space between flanges 11 so that the nut cannot be rotated within the recess. In this manner the slot defining portion of retainer bracket 5 is tightened securely to flange 8 of helmet 1 by turning screw 6 from the sides of frame 2, such as by a screw driver or a coin.

Bracket 5 may be adjusted to accommodate any desired lens or filter combination merely by positioning the fastening element along the length of the slot 9. The lenses can then be firmly secured by being compressed between the stop elements 7 and the retainer bracket 5 using fastening elements 6 and 6a as previously described.

Thus it can be seen that we have invented a simple and efficient device for positioning and securely retaining a variety of lens and filter combinations for safety helmets.

I claim:

1. In a safety helmet for welding, an integral forward projecting frame-like well portion having an opening in the center through which the wearer may view outside objects, and holes along its sides extending at right angles to said opening; fastening means inserted in said holes of said well portion; lens elements positioned against and larger than the opening in said well portion; and a retainer bracket positioned against the rearmost of said lens elements and having slots extending along the sides thereof at right angles to said lenses receiving said fastening means in selective positions along said slots adjustably securing said lens elements against said well portion.

2. A lens retaining device as recited in claim 1 together with a plurality of stop elements positioned along the inner periphery of said center opening.

References Cited

UNITED STATES PATENTS

| 1,838,611 | 12/1931 | Bowers | 2—9 XR |
| 2,174,667 | 10/1939 | Mentetski | 2—8 |
| 3,257,667 | 6/1966 | Anderson | 2—8 |

JAMES R. BOLER, Primary Examiner